United States Patent [19]
Weirich et al.

[11] 3,767,234
[45] Oct. 23, 1973

[54] DEVICES FOR INTERCONNECTING HYDRAULIC OR PNEUMATIC CONDUITS

[75] Inventors: Walter Weirich, Dortmund; Wilhelm Mutzke, Altlunen, both of Germany

[73] Assignee: Gewerkschaft Eisenhütte Westfalia, Westfalia, Germany

[22] Filed: Nov. 30, 1971

[21] Appl. No.: 203,272

[30] Foreign Application Priority Data

Dec. 3, 1970 Germany.................P 20 59 576.0

[52] U.S. Cl. ............................ 285/137 R, 285/305
[51] Int. Cl. ............................................ F16l 39/00
[58] Field of Search................... 285/137, 305, 310, 285/311, 312

[56] References Cited
UNITED STATES PATENTS

| 3,590,855 | 6/1971 | Woollen...................... 285/137 R X |
| 1,610,604 | 12/1926 | Heimburger et al............ 285/312 X |
| 3,268,260 | 8/1966 | Snipe........................... 285/305 UX |
| 3,560,027 | 2/1971 | Graham........................ 285/305 X |

FOREIGN PATENTS OR APPLICATIONS

| 1,255,417 | 11/1967 | Germany........................ 285/137 R |
| 469,594 | 8/1914 | France........................... 285/137 R |

Primary Examiner—Jordan Franklin
Assistant Examiner—Wayne L. Shedd
Attorney—Richard C. Sughrue et al.

[57] ABSTRACT

A device for connecting a plurality of hydraulic or pneumatic conduits to an appliance and composed of two interengaged detachable housing parts with a disc located for rotary movement within one of the parts. This one part receives a cylindrical sleeve which guides the conduits into the one part. The housing parts have complementary recesses which receive a clamping rod to secure the parts in a desired positional relationship. Each conduits has a hollow plug at its inner end which plug has a recess which is held in a radial slot in the disc. The slots in the disc are open at the periphery of the disc and the plugs are free to move along the slots during assembly of the device. The disc carries a locating pin which engages in the other of the housing parts so as to aid assembly and render the disc and the other part movable as a whole. This other part has bores into which the plugs are sealably received and these bores extend to an outlet portion attachable to the appliance.

1 Claim, 8 Drawing Figures

PATENTED OCT 23 1973  3,767,234

DEVICES FOR INTERCONNECTING HYDRAULIC OR PNEUMATIC CONDUITS

BACKGROUND TO THE INVENTION

The present invention relates to a device for the connection of pneumatic or hydraulic conduits — generally termed pressure fluid conduits to some appliance and is particularly, but not solely, concerned with a device for use in mineral mines. In such an environment there is a need for a constructionally simple device which will provide a flexible and versatile connection readily assembled and disassembled while providing reliability.

A general object of this invention is to provide such a device

SUMMARY OF THE INVENTION

In one aspect the invention provides a device for connecting pressure fluid conduits to an appliance; said device comprising a first housing part for receiving the conduits;

a second housing part detachably engaged with the first housing part, the first and second housing parts being relatively rotatable about an axis;

outlet bores in the second housing part leading to a portion thereof attachable to said appliance;

a disc-like guide member disposed for rotation with the first housing part;

means for locating the guide member in relation to the second housing part and for rendering the guide member and second housing part movable together in relation to said first housing part; and plugs each connected to an inner end of one of the conduits, each plug being located by said guide member to communicate with one of the outlet bores in the second housing part.

According to the present invention there is provided a device for the connection of hydraulic or pneumatic conduits to an appliance; said device comprising a housing adapted to receive said conduits, a hollow plug connected to each of said conduits, and communicating with outlet bores, a disc-like guide member disposed in the housing and movable in its circumferential direction at least in relation to a part of said housing, the guide member having slots extending generally radially thereof and serving to locate the plugs so that the plugs can move along the slots during assembly of the device.

The housing is preferably composed of first and second parts which are shaped in a complementary manner and can be disassembled from one another. The fact that the guide member is mounted in the housing in such a way as to be freely rotatable in its circumferential direction enables the housing parts to be realigned in respect of one another without damaging the conduits or causing leakage. The housing parts can be relatively simple components produced on automatic machines.

To ensure the correct alignment of the two housing parts and prevent them from being incorrectly fitted together, the invention further provides that the member is equipped, on the side facing towards the second part having the outlet bores therein, with a centering pin, which can be received in an appropriate bore in the second part. The centering pin preferably projects beyond the disc member by a greater amount than the plugs.

The first part of the housing may have a portion adapted for attachment to the appliance. The first and second parts are preferably positionally secured by a detachable clamping member.

In one form of the invention the guide member is located between a flange of the first housing part and a circlip located in an internal groove of said first housing part.

Each of the plugs may have collars defining a groove therebetween, the collars being located on opposite faces of the guide member with the groove disposed within the associated slot.

Furthermore, each of the plugs may have a portion extending into an end part of the associated outlet bore, and there is further provided a sealing ring located between the inner wall of the bore part and the plug portion.

Preferably a cylindrical sleeve is connected to the first housing part and serves to guide the conduits into the housing.

Preferably the sleeve has a flange which is disposed between the flange of the first housing part and the guide member. The sleeve can have axially extending slits and a clamping bush can be used to secure the sleeve and conduits together.

The invention may be understood more readily and various other features of the invention may become more apparent from consideration of the following description.

BRIEF DESCRIPTION OF DRAWINGS

Embodiments of the invention will now be described, by way of examples only, with reference to the accompanying drawings wherein.

DESCRIPTION OF PREFERRED EMBODIMENTS

Figure 1:
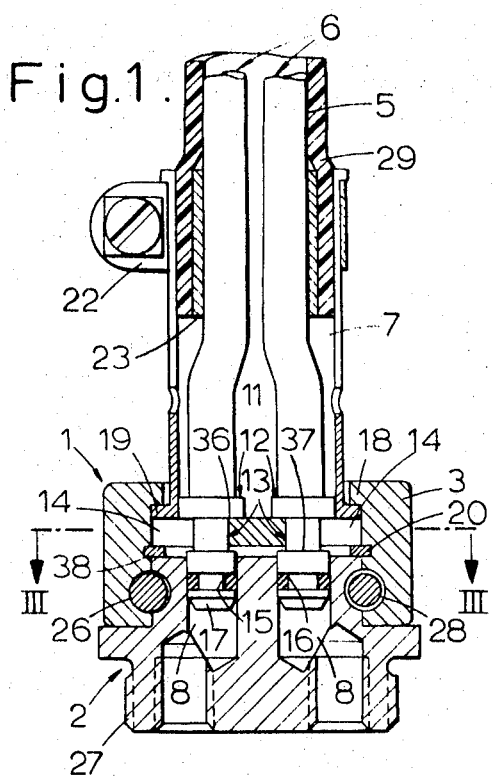
FIG. 1 is a longitudinal-sectional view of a device made in accordance with the invention.
Figure 4:
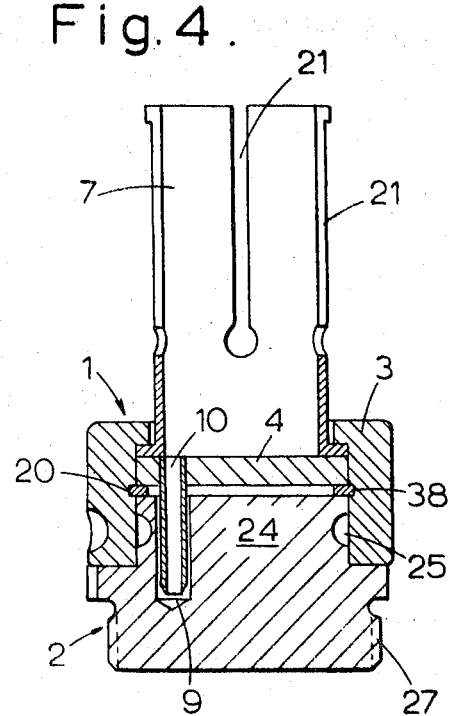
FIG. 4 is a longitudinal-sectional view of the device shown in FIG. 1, the view being taken along the line IV—IV of FIG. 3.
Figure 2:
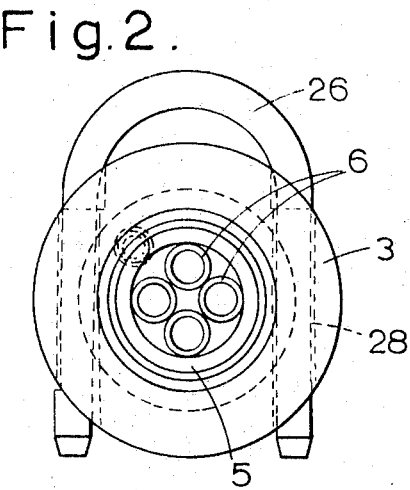
FIG. 2 is a plan view of the device shown in FIG. 1.
Figure 3:
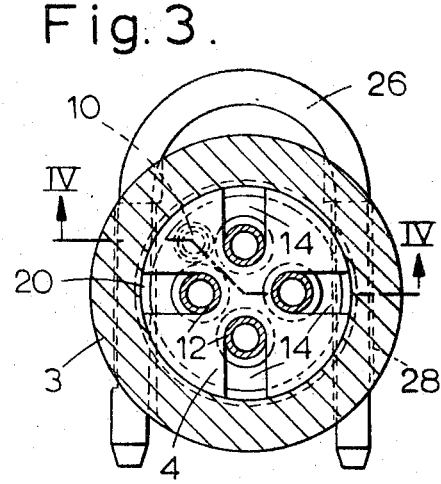
FIG. 3 is a cross-sectional view of the device shown in FIG. 1, the view being taken along the line III—III of FIG. 1.

As shown in FIGS. 1 – 4, the device is composed of two complementary parts, denoted 1 and 2, which are interconnected to form a composite housing. The housing part 1 has a main annular body 3 provided with an inwardly directed flange 18 which extends over a flange 19 formed at the lower end of a cylindrical sleeve 7. The sleeve 7 receives at its upper end a tubular cover 5 containing a number, in this case four, pneumatic or hydraulic conduits 6 which are lead into the housing 1,2.

The lower side of the flange 19 faces a guide member in the form of a disc 4 which rests on a circlip 20 received in a groove 38 formed at the inside of the body 3 so that the disc 4 can be rotated in relation to the housing part 1. The conduits 5 are slightly bent axially outwards at the lower end of the sleeve 7, as at 11, and each conduit 6 is sealably connected to a generally cylindrical hollow plug 12 extending through the disc 4. More particularly, the plugs 12 each have end collars 36, 37 defining a groove 13 which locates in a radially directed U-shaped slot 14 in the disc 4. The slots 14 are symmetrically arranged about the axis of the disc 4 and are open at the periphery of the disc 4. The axial length of the groove 13 in each plug 12 is slightly greater than the thickness of the disc 4 so that each plug 12 is axially movable to a limited extent as well as bodily movable along the associated slot 14 when the device is being assembled.

The housing part 2 has a shoulder which abuts against the lower face of the body 3 and a central portion 24 which extends into the body 3. The peripheral surface of the central portion 24 of the part 2 is provided with a continuous recess 25, and the peripheral surface of the body 3 of the part 1 is provided with two oppositely located linear recesses 28 which extend tangentially of the peripheral surface. The recesses 25, 28 are semi-circular in cross-section and receive a clamping member or rod 26 which serves to secure the parts 1, 2 together. The central portion 24 of the housing part 2 has axially extending bores 8 therein which receive the lower end portions of the plugs 12. This central portion 24 also has a blind bore 9 which receives a locating pin 10 carried by the disc member 4. The plugs 12 can move along the slots 14 in the disc 4, and the housing part 2 can be rotated in relation to the housing part 1 when the rod 26 is removed.

The lower portions of the plugs 12 located in the bores 8 are each provided with a groove 15 accommodating a sealing ring 16 and terminates in a tapered end section 17. The housing part 2 has an outer portion provided with outlet bores radially offset from and communicating with the bores 8. This outer portion is externally threaded as at 27 to enable the device to be attached to some other appliance.

The sleeve 7 has a number of axial slits 21 extending downwardly from its upper end and a clamping bush 22 extends around the upper portion of the sleeve 7 containing the cover 5. The slits 21 enable the sleeve 7 to be slightly deformed inwards over the portion of the cover 5 extending into the sleeve 7 and commencing at 28 when the bush 22 is tightened. An additional protective tube 23, which can be essentially rigid, is arranged between the cover 5 and the conduits 6. The bush 22 is used to secure the cover 5 and the sleeve 7 to the conduits 6, and the tube 23 serves to protect the conduits 6.

Figure 5:
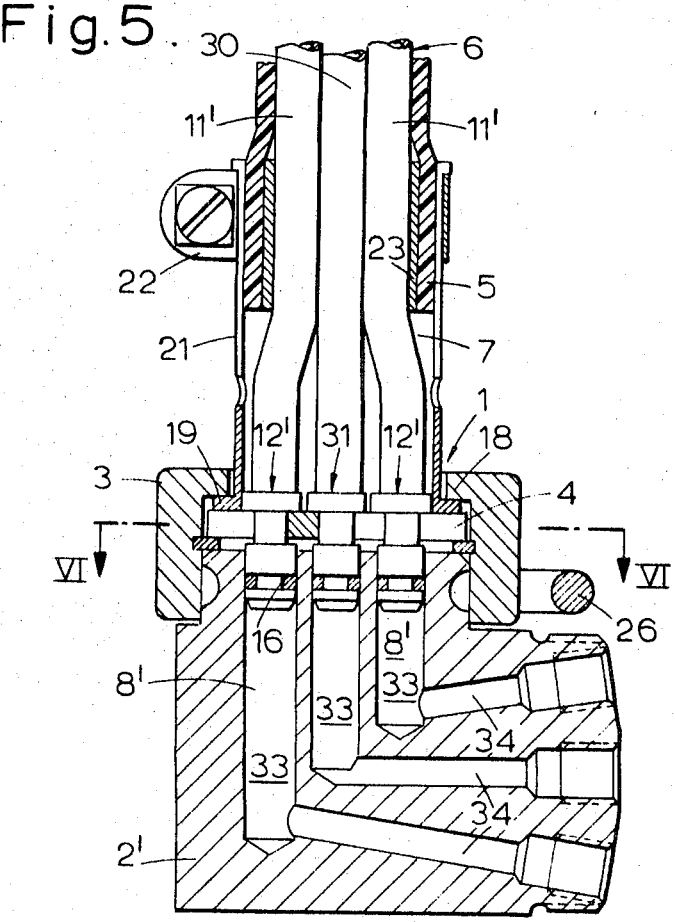
FIG. 5 is a longitudinal-sectional view of a further device made in accordance with the invention.
Figure 6:
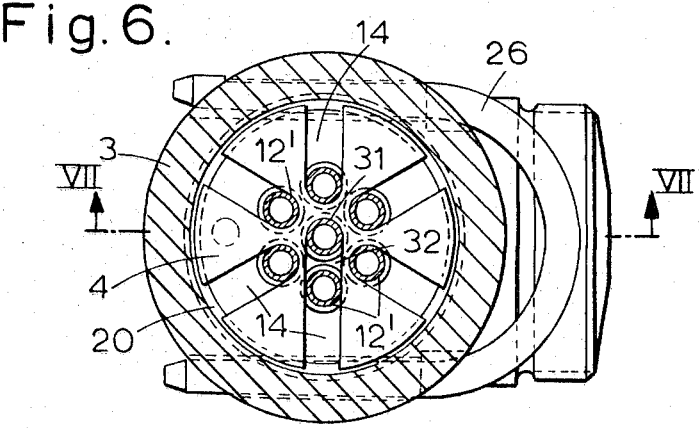
FIG. 6 is a cross-sectional view of the device shown in FIG. 5, the view being taken along the line VI—VI of FIG. 5.
Figure 7:
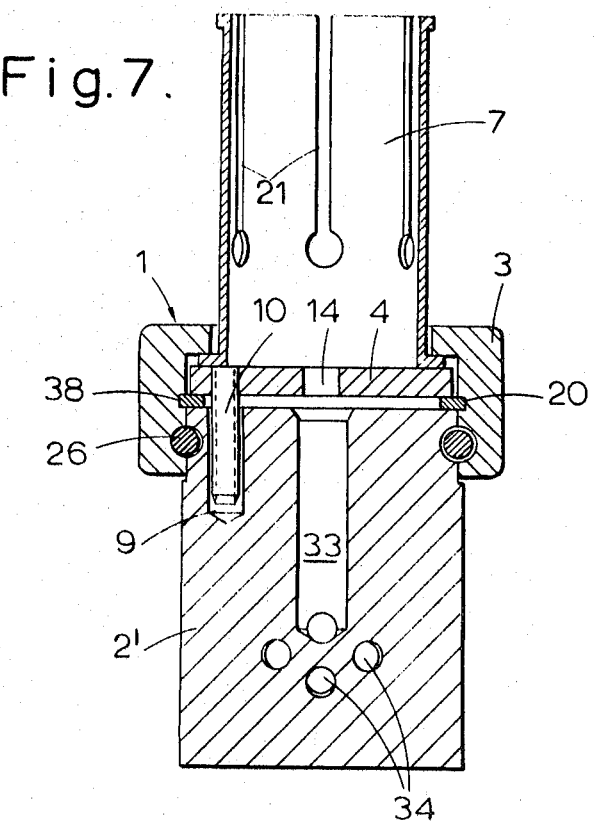
FIG. 7 is a longitudinal-sectional view of the device shown in FIG. 5, the view being taken along the line VII—VII of FIG. 6.
Figure 8:
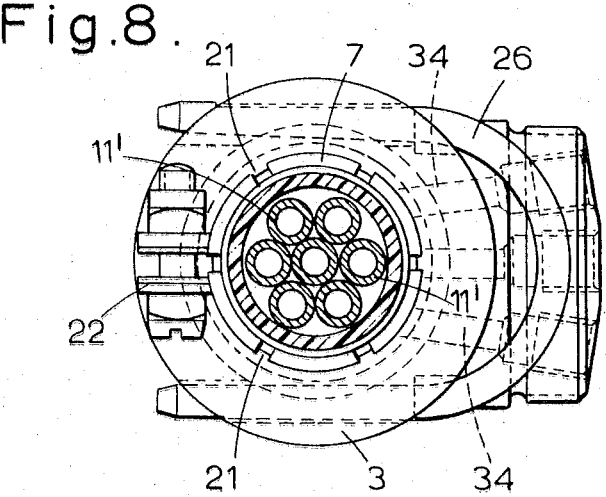
FIG. 8 is a plan view of the device shown in FIG. 5.

The device depicted in FIGS. 5 to 8 is similar to the device described in conjunction with FIGS. 1 to 4 and like reference numerals or like reference numerals with primes are used to denote like parts or similar parts. In contrast to the device illustrated in FIGS. 1 to 4 the device shown in FIGS. 5 to 7 receives seven conduits 6. Six of these conduits 6 are connected to plugs 12' which are located in symmetrically arranged radial slots 14 in the disc 4 while the centre conduit denoted 30 extends along the axis of the sleeve 7 and is similarly connected to a plug 31 which is received in an extended part 32 of one of the slots 14. The housing part 2' has an extended angled portion with channels 33 composed of bores 8' receiving the plugs 31, 12' and outlet bores 34 leading to an end face of the angled portion which is attachable to an appliance.

We claim:

1. A device for connecting a plurality of pressure fluid conduits to an appliance, said device comprising:
   a. a housing for receiving said conducts, said housing being composed of a first part detachably connected to a second part, the first housing part being of cylindrical form with a flange at one end extending radially inwards and an internal peripheral surface, detachable support means projecting radially outwards from said pheripheral surface and being axially spaced from said flange, and at least one recess in said peripheral surface adjacent at the side of said support means remote from said flange, the second housing part having a central portion projecting axially inwards of the first part to be received therein, a plurality of bores within said central portion and leading axially outwards from the inner end of said central portion to form outlets for feeding pressure fluid to said appliance, a further bore within said central portion and extending axially from said inner end of the central portion, and at least one recess in the outer peripheral surface which is complementary to said recess in the inner peripheral surface of the first housing part;
   b. a detachable locking member located in the complementary recesses in the central portion of said second part and the inner peripheral surface of the first part to secure said parts together;
   c. An elongated sleeve projecting axially outwardly from said first housing part, said sleeve serving to receive the conduits therein and to guide said conduits into the housing, the sleeve having at its inner end a flange extending radially outwards and engaging beneath the flange of the first housing part and a number of axial slits located at an outer end portion thereof enabling the outer end portion to be deformed radially inwards;
   d. clamping means for deforming said sleeve and clamping said conduits therein;
   e. a protective member surrounding said conduits at the end portion of the sleeve to protect said conduits when the conduits are clamped in the sleeve;
   f. a disc member supported by said support means within said first housing part beneath the flange of the sleeve, said disc member having a plurality of radial slots therein which slots are open at the periphery of the disc member and closed radially inwards thereof and a projecting location pin disposed on the side of the disc member remote from said flange, said pin being received by the further bore in the central portion of the second housing part;
   g. a hollow plug located in each of the slots of the disc member, said plug having collars defining a groove therebetween which is received by the associated slot so that the collars are disposed on opposite sides of the disc member, the plug being displaceable to a limited extent in relation to the disc member, each hollow plug being connected to the inner end of a respective one of the conduits and having an outer end portion received within an associated one of the bores in the second housing part; and
   h. sealing means located between the end portion of each plug and its associated bore.

* * * * *